US005642234A

United States Patent [19]
Altman et al.

[11] Patent Number: 5,642,234
[45] Date of Patent: Jun. 24, 1997

[54] ILLUMINATED MAGNIFYING LENS ASSEMBLY

[75] Inventors: Peter Altman, Austin, Tex.; Rudy Vandenbelt, Ottawa, Canada

[73] Assignee: Lumatec Industries, Inc., Austin, Tex.

[21] Appl. No.: 549,938

[22] Filed: Oct. 30, 1995

[51] Int. Cl.$^6$ .................................. G02B 27/02
[52] U.S. Cl. ................. 359/802; 359/808; 359/817
[58] Field of Search ........................ 359/802, 803, 359/808, 809, 810, 817

[56] References Cited

U.S. PATENT DOCUMENTS

| | | | |
|---|---|---|---|
| 1,590,492 | 6/1926 | Benson | 206/234 |
| 1,838,494 | 12/1931 | Neuwirth | 359/817 |
| 2,682,805 | 7/1954 | Tomasovic | 359/817 |
| 4,763,986 | 8/1988 | Sego | 359/817 |

*Primary Examiner*—Loha Ben
*Attorney, Agent, or Firm*—John R. Flanagan

[57] ABSTRACT

An illuminated magnifying lens assembly includes a magnifying lens, a storage case having upper and lower portions, a support frame disposed about and supporting the lens, and a retainer element and fastener secured to the case and pivotally connecting the frame to the case such that the frame and lens therewith may be pivoted relative to the case in a circular arc from a stored position between the upper and lower portions of the case to a plurality of deployed viewing positions wherein the frame is angularly displaced from the case and the lens is exposed. The lens assembly also includes an electrical light source disposed within the frame for emitting and projecting light through a small hole in the frame and onto an object being magnified by the lens as observed through the lens. The light source is activated by pivoting the frame in a predetermined direction from the stored position to one of the deployed positions. The light source include a lamp, batteries, and a switch mechanism. The switch mechanism includes a contact element movable between open and closed positions, and a cam element disposed about the retainer element and acting on the contact element to move it from the open to closed position when the frame is pivoted in the predetermined direction from the stored to deployed position.

17 Claims, 2 Drawing Sheets

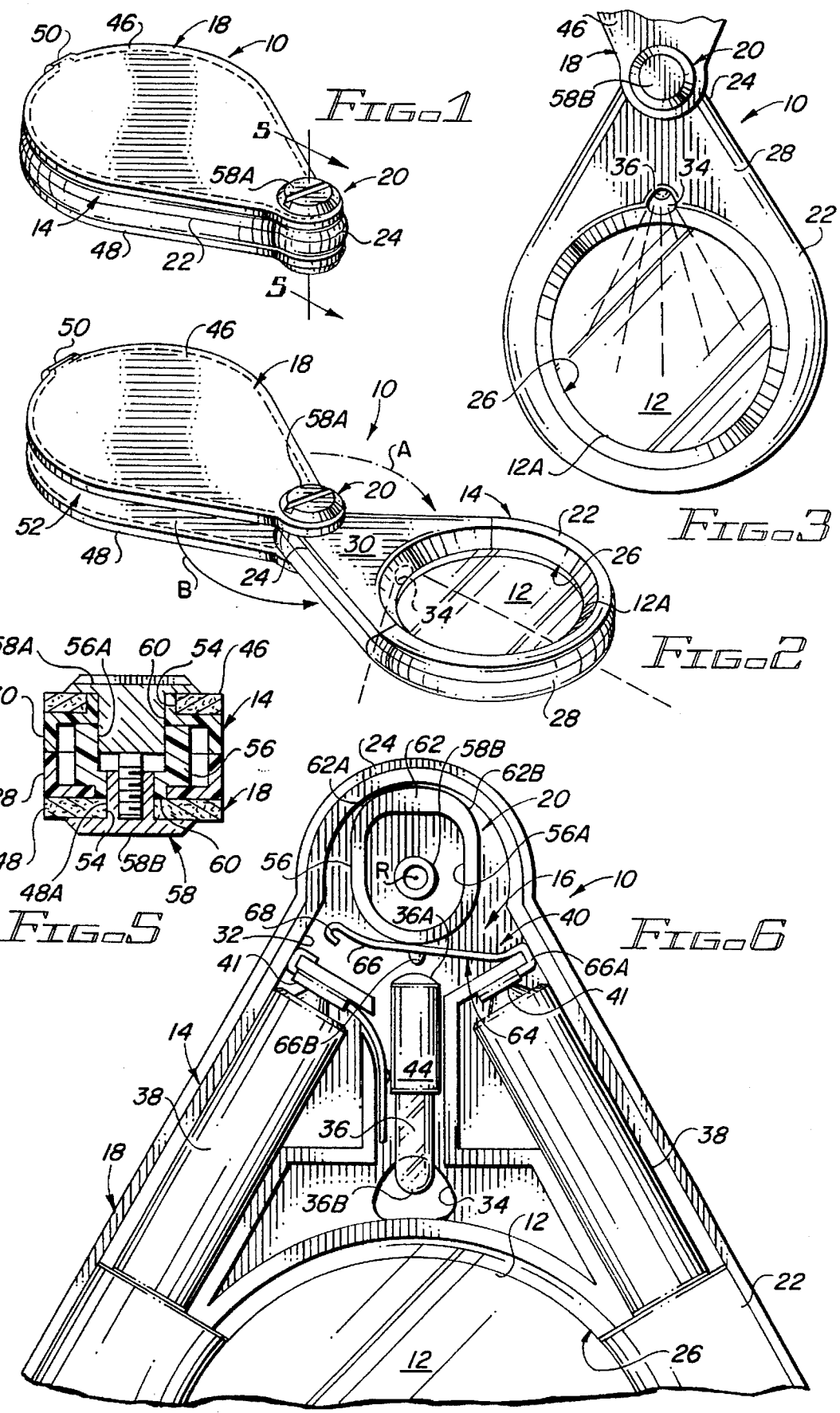

ILLUMINATED MAGNIFYING LENS ASSEMBLY

BACKGROUND OF THE INVENTION

1. Field of the Invention

The present invention generally relates to a magnifying lens assembly and, more particularly, is concerned with a magnifying lens assembly that includes a light which may be activated to illuminate the surface being magnified.

2. Description of the Prior Art

It has been known for many years to provide a portable magnifying lens assembly having a frame holding a magnifying lens and a case pivotally connected to the frame. The case and frame with the lens may be pivoted relative to one another between a stored position in which the magnifying lens is covered and thus protected by the case and a deployed position in which the lens is uncovered and thus exposed for use in viewing and magnifying a surface. When the magnifying lens is being used, the case serves as a handle for holding the frame and lens. Since the case in the deployed position relative to the magnifying lens remains attached to the frame, it is impossible to misplace the case while the lens is being used. One example of such lens assembly is discloses in U.S. Pat. No. 1,590,492 to Benson.

While a magnifying lens is quite useful when one is reading small print or examining fine details, sometimes there is not adequate light directed on the surface that is being magnified. One solution to the problem of inadequate light is to use a separate light, such as a flashlight, to project light onto the surface being magnified. However, concurrent coordination of the positions of the magnifying lens and flashlight relative to the surface being magnified can be a difficult task for some persons.

Heretofore, it appears that there has been no magnifying lens assembly which incorporates a source of light so as to direct light on the magnified surface. Consequently, a need for such a magnifying lens assembly has been perceived by the inventors herein.

SUMMARY OF THE INVENTION

The present invention provides an illuminated magnifying lens assembly designed to satisfy the aforementioned need. The magnifying lens assembly of the present invention incorporates a source of light in a support frame of the assembly. The light source is positioned in the support frame so as to emit and project the light on a surface which is magnified when viewed directly through the magnifying lens of the assembly. The source of light includes at least one battery, a lamp and a switch mechanism mounted to the support frame. Preferably, the battery provides power to the lamp and the switch mechanism is utilized to turn the lamp on and off as desired by pivoting the support frame holding the lens in a predetermined direction relative to a storage case between stored and deployed positions.

Accordingly, the present invention is directed to an illuminated magnifying lens assembly which basically comprises: a magnifying lens; a support frame mounting and holding the magnifying lens; and an electrical light source mounted to the support frame adjacent to the magnifying lens and being oriented relative to the support frame to emit and project light below the lens toward a surface being magnified by the lens as observed by viewing the surface through the lens. The electrical light source includes an electrical circuit mounted within the support frame and having a lamp, at least one and preferably a pair of batteries, and a switch mechanism. The support frame defines a large opening in which the lens is received with the frame surrounding and mounting the lens about the periphery thereof. The support frame also has a small hole defined therein adjacent to the large opening. The lamp is disposed in the support frame adjacent to the small hole so as to emit and project light therethrough and onto the surface being magnified by the lens.

Also, the magnifying lens assembly comprises: a storage case having a pair of spaced upper and lower portions and a storage compartment defined therebetween being open along opposite sides thereof; and means for attaching the storage case to the support frame such that the support frame and the lens held therein can together undergo pivotal movement relative to the storage case between a stored position in which the support frame and lens are disposed in the storage compartment between and covered by the upper and lower portions of the storage case and a deployed position in which the storage case is angularly displaced away from the support frame and lens. The attaching means includes a retainer element disposed within the support frame and a fastener extending through the retainer element, support frame, and upper and lower portions of the storage case. The fastener is attached to the retainer element so as to secure the retainer element to the storage case for movement therewith and to pivotally connect the support frame to the retainer element for movement of the support frame relative to the retainer element and storage case.

Further, the switch mechanism of the electrical light source causes activation and deactivation of the lamp thereof only within a predetermined portion, such as from 90 to 180 degrees in one direction from the storage position, of a 360-degree circular arc of movement the support frame relative to the storage case between the stored and deployed positions. The switch mechanism of the light source includes a cam element attached about the retainer element within the support frame and a contact element mounted to and within the support frame adjacent to the retainer element and cam element. The contact element is adapted to undergo movement between a first position in which the switch mechanism is open and the circuit is incomplete and a second position in which the switch mechanism is closed and the circuit is complete. The cam element is shaped and positioned on the retainer element adjacent to the contact element such that the cam element engages and acts on the contact element to move it from the first position to the second position only as the support frame is pivoted relative to the retainer element and storage case between the stored and deployed positions through the predetermined portion of the circular arc of relative movement therebetween. The cam element does not engage nor act on the contact element when the support frame is pivoted relative to the retainer element and storage case through the remaining portion of the circular arc of relative movement therebetween. Thus, the lens may be utilized with or without illumination depending upon the angular position of the support frame from the storage case in the deployed position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

3

FIG. 1 is a perspective view of an illuminated magnifying lens assembly of the present invention showing a support frame and magnifying lens held therein disposed in a stored position.

FIG. 2 is a perspective view of the magnifying lens assembly showing the support frame and magnifying lens disposed in a deployed position.

FIG. 3 is an enlarged fragmentary bottom plan view of the magnifying lens assembly showing a hole in the support frame from which light is projected to a surface to be magnified by an electrical light source disposed within the support frame.

Figure 4:
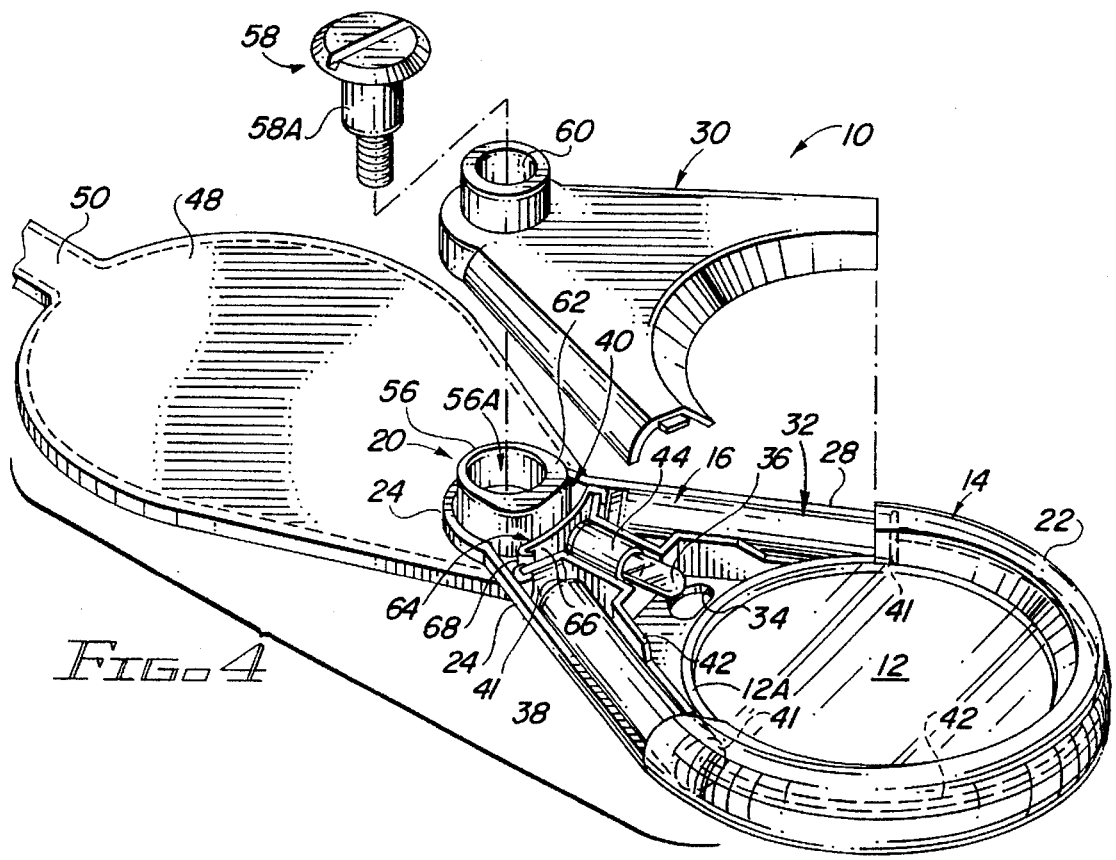

FIG. 4 is an enlarged exploded perspective view of the magnifying lens assembly exposing the electrical light source disposed in the support frame.

FIG. 5 is an enlarged sectional view taken along line 5—5 of FIG. 1 showing a fastener securing a retainer element to the storage case and pivotally connecting to the support frame to the retainer element and storage case for permitting the support frame to undergo pivotal movement relative to retainer element and storage case.

FIG. 6 is an enlarged fragmentary top plan view of the electrical light source of FIG. 4 showing the relative position of a contact element of the switch mechanism of the light source and a cam element on the retainer element secured to the storage case when the support frame is in the stored position relative to the storage case.

Figure 7:
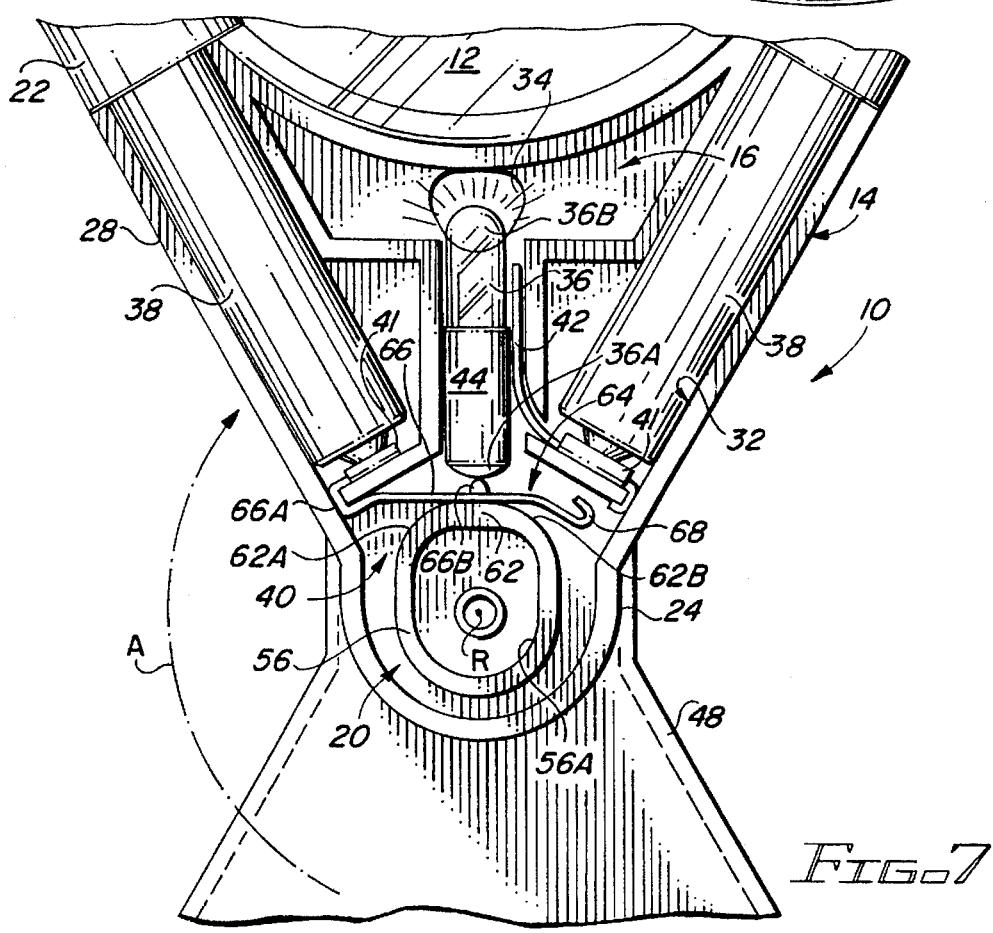

FIG. 7 is a view similar to that of FIG. 6 but showing the relative position of the contact element and the cam element on the retainer element when the support frame is in the deployed position relative to the storage case.

DETAILED DESCRIPTION OF THE INVENTION

Referring to the drawings, and particularly to FIGS. 1–3, there is illustrated an illuminated magnifying lens assembly of the present invention, generally designated 10. The lens assembly 10 basically includes a magnifying lens 12 of generally circular configuration, a support frame 14 of generally annular configuration and being disposed about and mounting and holding the magnifying lens 12, and an electrical light source 16 mounted to the support frame 14. In addition, the lens assembly 10 includes a cover or storage case 18 and means 20 for attaching the support frame 14 to the storage case 18 so that the support frame 14 can undergo pivotal movement relative thereto between a stored position, as seen in FIG. 1, and a deployed position, as seen in FIG. 2.

Referring to FIGS. 1–4, the support frame 14 of the lens assembly 10 is hollow and has a generally teardrop configuration defined by an annular portion 22 and an attachment portion 24 merging with and projecting from one side of the annular portion 22. The annular portion 22 defines a large opening 26 in which the magnifying lens 12 is received. The annular portion 22 of the support frame 14 surrounds and mounts the magnifying lens 12 about the periphery 12A thereof. Also, the support frame 14 includes a base 28 and a cover 30 removably mounted to the base 28 and defining a hollow cavity 32 therewith in the support frame 14. The base 28 is coextensive with the annular portion 22 and attachment portion 24 of the support frame, whereas the removable cover 30 is coextensive with the attachment portion 24 and only with the side of the annular portion 22 at which the attachment portion 24 merges therefrom. Further, as best seen in FIG. 3, the underside of the support frame 14 includes a small hole 34 formed in the

4 base 28 thereof adjacent to the large opening 26 and the magnifying lens 12 supported therein. The small hole 34 defines a passageway from the hollow cavity 32 to the exterior of the support frame 14.

Referring to FIGS. 4, 6 and 7, the electrical light source 16 of the lens assembly 10 is disposed within the hollow cavity 32 of the support frame 14 adjacent to the magnifying lens 12. The light source 16 basically includes a light bulb or lamp 36 for emitting and projecting light, at least one and preferably a pair of batteries 38, and a switch mechanism 40 being connected by suitable electrically conductive terminal contacts 41 and conductors 42 to the lamp 36 and batteries 38 to form an electrical circuit. As described below, the switch mechanism 40 is actuated and deactuated to respectively turn on and off the lamp 36. The lamp 36 is mounted in and electrically coupled with a socket 44 which, in turn, is mounted on the attachment portion 24 of the base 28 of the support frame 14 between the batteries 38. The inner end 36A of the lamp 36 extends from the socket 44 (and is electrically isolated therefrom) for electrical contact by the switch mechanism 40. The outer end 36B of the lamp 36 is disposed adjacent to the hole 34 in the underside of the support frame 14 and of the magnifying lens 12 received therein. Further, the lamp 36 is oriented relative to the support frame 14 and hole 34 therein so as to emit and project the light through the hole 34 to below the magnifying lens 12 and toward the surface being magnified by the lens 12 as observed by the user viewing the surface through the lens 12.

Referring to FIGS. 1–7, the storage case 18 of the lens assembly 10 includes an upper portion 46, a lower portion 48, and a web portion 50 extending between, interconnecting and spacing apart the upper and lower portions 46, 48. The upper and lower portions 46, 48 are substantially identical to the teardrop shape of the support frame 14. The opposite ends of the web portion 50 is attached to first segments of the peripheries of the upper and lower portions 46, 48. The spaced upper and lower portions 46, 48 of the storage case 18 define a storage compartment 52 therebetween, being partially open along opposite second segments of the peripheries thereof. Further, the upper and lower portions 46, 48 of the storage case 18 have respective apertures 54 defined therein adjacent to third segments of the peripheries thereof being opposite to the first segments thereof where the first and second portions 46, 48 are interconnected together by the web portion 50. The storage case 18 may be made from any suitable material, one example of which being leather.

Referring still to FIGS. 1–7, the attaching means 20 of the lens assembly 10 includes a tubular retainer element 56 disposed within the hollow cavity 32 in the attachment portion 24 of the support frame 14 and between the base 28 and cover 30 thereof. The retainer element 56 extends between the upper and lower portions 46, 48 of the storage case 18 and is aligned with the apertures 54 therein. As best seen in FIGS. 4 and 5, the attaching means 20 also includes a fastener 58 having a pair of upper and lower complementarily threaded fastener parts 58A, 58B which when threaded together extend through a central bore 56A of the retainer element 56. The lower fastener part 58B is inserted into the lower end of the retainer element 56 in a tight press-fitted relationship therewith so as to clamp therebetween an annular edge 48A of the lower portion 48 of the storage case 18 surrounding the one aperture 54 therein such that the retainer element 56 and fastener 58 are fixedly secured to and move with the storage case 18. The lower end of the retainer element 56 extends through an aperture 60 defined through the attachment portion 24 of the base 28 of the support frame while the upper and lower parts 58A, 58B of the fastener 58 extend respectively through apertures 60 defined through the attachment portion 24 of the base 28 and cover 30 of the support frame 14 so as to pivotally connect the support frame 14 to the storage case 18 such that the support frame 14 and magnifying lens 12 can undergo pivotal movement through a circular 360-degree arc about an axis of rotation R defined by the retainer element 56 and fastener 58 as indicated by the arrows A, B in FIG. 2, relative to the storage case 18. In the storage position of FIG. 1, the support frame 14 and lens 12 are disposed in the storage compartment 52 of the storage case 18, whereas in the deployed position of FIG. 2 the support frame 14 and lens 12 are angularly displaced away from the storage case 18.

Referring to FIGS. 4-7, the switch mechanism 40 of the light source 16 includes a cam element 62 and a contact element 64. The cam element 62 of the switch mechanism 40 is integrally formed with the retainer element 56 extending partially about the retainer element 56 so as to be eccentrically offset relative to the axis of rotation R defined by the retainer element 56 and from the remaining circular portion of the retainer element 56. Thus, with the retainer element 56, the cam element 62 is disposed within the hollow cavity 32 in the attachment portion 24 of the support frame 14.

The contact element 64 is disposed within and mounted to the support frame 14 adjacent to the cam element 62. The contact element 64 has an elongated arm 66 which is anchored at one end 66A to the base 28 where it is electrically and integrally connected to one terminal contact 41 engaging an end of one of the batteries 38. The opposite free end 68 of the arm 66 has a curved configuration and is positioned closer to one end 62A of the cam element 62 than to the opposite end 62B thereof. Specifically, with the support frame 14 at the stored position relative to the storage case 18, the curved free end 68 of the contact element arm 66 is located through an approximately 90-degree arc of movement of the support frame 14 from the one end 62A of the cam element 62, whereas the curved free end 68 of the arm 66 is located through an approximately 180-degree arc of movement of the support frame 14 from the opposite end 62B of the cam element 62. Thus, the switch mechanism 40 causes activation and deactivation of the lamp 36 only within a predetermined portion, such being from approximately 90 degrees to 180 degrees from the storage position in only the direction of the arrow A of FIG. 7, of the 360-degree circular arc of movement the support frame relative to the storage case between the stored and deployed positions.

The contact element 64 is made of resiliently flexible material and thus adapted to undergo bending movement between a first position, as shown in FIG. 6, and a second position, as shown in FIG. 7. In the first position, the free end 68 of the contact element 64 is spaced from an end of another terminal contact 41 engaging an end of the other one of the batteries 38 which, in turn, is integrally connected with a conductor element 42 engaging the lamp socket 44. The arm 66 of the contact element 64 is spaced from the inner end 36A of the lamp 36 such that an open circuit condition exists and the lamp 36 is turned off. In the second position, the arm 66 of the contact element 64 engages the inner end 36A of lamp 36 such that a closed circuit condition exists and the lamp 36 is turned on. The arm 66 of the contact element 64 has a dimple 66B formed thereon midway between its opposite ends and extending therefrom towards the lamp 36 so as to reduce the distance through which the contact element 64 must move in order to contact the end of the lamp 36.

Thus, the difference in the length of the arcuate displacement of the free end 68 of the contact element arm 66 from the respective opposite ends 62A, 62B of the cam element 62 ensures that the one end 66A of the cam element 62 only engages and acts on the contact element 64 to move it from its first to second position when the support frame 14 is pivoted through the aforementioned 90-degree portion of the 360-degree circular arc of movement in the clockwise direction, as shown by arrow A in FIGS. 2 and 6, from the storage position. Only after the support frame 14 is pivoted through approximately 180 degrees in the counterclockwise direction, as shown by arrow B in FIG. 2, will the opposite other end 62A of the cam element 62 engage and act on the contact element 64 and move it from its first to second position. Thus, illuminated viewing positions are defined along the predetermined portion of the clockwise circular arc of movement of the support frame 14 between approximately 90 degrees to 180 degrees along arrow A about the axis R from the storage position, as viewed in FIGS. 2 and 6. Conversely, non-illuminated viewing positions are defined along a counterclockwise arc of movement of from about 45 degrees to 180 degrees along arrow B about the axis R from the storage position, as viewed in FIG. 2. Thus, a smaller range of illuminated viewing positions are defined compared to the larger range of non-illuminated viewing positions. This means that lens assembly 10 may be used with or without the lamp 36 being illuminated.

It should be mentioned that the removable cover 30 of the support frame 14 provides access to the lamp 36 and batteries 38 so that they may be replaced. To replace the lamp 36 or batteries 38, the cover 30 is removed and the lamp 36 and batteries 38 exposed by unfastening the upper part 58A of the fastener 58 from the lower part 58B thereof which, in turn, releases the upper portion 46 of the storage case 18. The cover 30 has a pair of end tabs 30A formed thereon and projecting therefrom to removably fit under adjacent edges of the base 28 of the support frame 14.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An illuminated magnifying lens assembly, comprising:

(a) a magnifying lens;

(b) a support frame mounting and holding said magnifying lens; and (c) an electrical light source mounted to said support frame adjacent to said magnifying lens and being oriented relative to said support frame to emit and project light below said magnifying lens toward an object magnified by said magnifying lens as observed by viewing the object through said magnifying lens;

(d) said support frame having a hollow cavity and said electrical light source being disposed within said cavity of said support frame;

(e) said electrical light source including
  (i) a lamp for emitting and projecting the light,
  (ii) at least one battery connected to said lamp, and
  (iii) a switch mechanism connected between said lamp and battery in an electrical circuit therewith, said switch mechanism being activatable and deactivatable to turn on and off said lamp;

(f) said support frame having a hole defined therein, said lamp being disposed in said support frame adjacent to said hole so as to emit and project the light therethrough and onto the object being magnified by said magnifying lens;

(g) said support frame including a base and a cover removably mounted to said base and defining said hollow cavity therewith in said support frame, said battery, lamp and switch mechanism being disposed within said hollow cavity of said support frame.

2. The assembly of claim 1 wherein said hole is formed in said base of said support frame and defines a passageway for the light projected from said hollow cavity to exterior of said support frame.

3. An illuminated magnifying lens assembly, comprising:

(a) a magnifying lens;

(b) a support frame mounting and holding said magnifying lens;

(c) an electrical light source mounted to said support frame adjacent to said magnifying lens and being oriented relative to said support frame to emit and project light below said magnifying lens toward an object magnified by said magnifying lens as observed by viewing the object through said magnifying lens;

(d) a storage case having a storage compartment; and (e) means for pivotally attaching said storage case to said support frame such that said support frame and said magnifying lens held by said support frame can together undergo pivotal movement relative to said storage case between a stored position in which said support frame and lens are disposed in said storage compartment of said storage case and a deployed position in which said support frame and lens are angularly displaced from said storage case;

(f) said storage case including a pair of spaced upper and lower portions having respective peripheries, said upper and lower portions being interconnected to one another at adjacent first segments of said peripheries thereof and defining said storage compartment therebetween, said storage compartment being partially open along adjacent second segments of said peripheries thereof;

(g) said upper and lower portions of said storage case having respective apertures defined therein adjacent to said peripheries thereof at locations opposite said first segments of said peripheries where said first and second portions are interconnected;

(h) said attaching means including a retainer element disposed in said support frame and extending between said upper and lower portions of said storage case and aligned with said apertures therein;

(i) said support frame including a base and a cover removably mounted to said base and defining a hollow cavity therewith in said support frame, said battery, lamp and switch mechanism being disposed within said hollow cavity of said support frame, said retainer element being disposed between said base and cover of said support frame.

4. The assembly of claim 3 wherein said support frame has a hollow cavity and said electrical light source is disposed within said hollow cavity of said support frame.

5. The assembly of claim 4 wherein said electrical light source includes:

a lamp for emitting and projecting the light;

at least one battery connected to said lamp; and a switch mechanism connected between said lamp and battery in an electrical circuit therewith, said switch mechanism being activatable and deactivatable to turn on and off said lamp.

6. The assembly of claim 5 wherein said support frame has a hole defined therein, said lamp being disposed within the support frame adjacent to said hole so as to emit and project the light therethrough and onto the object being magnified by said magnifying lens.

7. The assembly of claim 6 wherein said support frame includes a base and a cover removably mounted to said base and defining said hollow cavity therewith in said support frame, said battery, lamp and switch mechanism being disposed within said hollow cavity of said support frame.

8. The assembly of claim 7 wherein said hole is formed in said base of said support frame and defines a passageway for the light projected from said hollow cavity to exterior of said support frame.

9. The assembly of claim 3 wherein said attaching means also includes a fastener extending through said retainer element and releasably clamping said cover of said support frame on said base thereof.

10. The assembly of claim 3 wherein said attaching means also includes a fastener extending through said retainer element and securing said retainer element to said upper and lower portions of said storage case and pivotally connecting said retainer element and said storage case to said support frame such that said support frame can undergo pivotal movement relative to said storage case between said storage and deployed positions.

11. The assembly of claim 10 wherein said light source includes a switch mechanism having a cam element defined on said retainer element and disposed within said support frame and a contact element mounted within said support frame adjacent to said cam element, said contact element being adapted to undergo movement between a first position in which said contact element is spaced from said lamp such that said lamp is turned off and a second position in which said contact element engages said lamp such that said lamp is turned on.

12. The assembly of claim 11 wherein said cam element is positioned within said support frame adjacent to said contact element and shaped such that said cam element engages and acts on said contact element to move said contact element from the first position to the second position only when said support frame is pivoted relative to said retainer element and storage case from the stored position toward the deployed position in a first direction relative to said storage case.

13. The assembly of claim 12 wherein said cam element acts on said contact element to move it from said first position to said second position when said support frame has been pivoted relative to said retainer element and storage case to a position which is between approximately 90 degrees and 180 degrees measured from said stored position.

14. The assembly of claim 11 wherein said contact element has a dimple formed thereon, said dimple extending from said contact element towards said lamp and thereby reducing the distance said contact element must move in order to contact said lamp.

15. An illuminated magnifying lens assembly, comprising:

a magnifying lens;

(b) a support frame mounting and holding said magnifying lens;

(c) an electrical light source mounted to said support frame adjacent to said magnifying lens and being oriented relative to said support frame to emit and project light below said magnifying lens toward an object magnified by said magnifying lens as observed by viewing the object through said magnifying lens;

(d) a storage case having a storage compartment; and (e) means for pivotally attaching said storage case to said support frame such that said support frame and said magnifying lens held by said support frame can together undergo pivotal movement relative to said storage case between a stored position in which said support frame and lens are disposed in said storage compartment of said storage case and a deployed position in which said support frame and lens are angularly displaced from said storage case;

(f) said light source including a switch mechanism having a cam element defined on said attaching means and disposed within said support frame and a contact element mounted within said support frame adjacent to said cam element, said contact element being adapted to undergo movement between a first position in which said contact element is spaced from said lamp such that said lamp is turned off and a second position in which said contact element engages said lamp such that said lamp is turned on.

16. The assembly of claim 15 wherein said cam element is positioned within said support frame adjacent to said contact element and shaped such that said cam element engages and acts on said contact element to move said contact element from the first position to the second position only when said support frame is pivoted from the stored position toward the deployed position in a first direction and predetermined arcuate distance relative to said storage case.

17. The assembly of claim 16 wherein said cam element acts on said contact element to move it from said first position to said second position when said support frame has been pivoted relative to said storage case to a position which is between approximately 90 degrees and 180 degrees from said stored position.

* * * * *